May 9, 1961 W. C. HARTMAN ET AL 2,983,908
CORRECTING MEANS FOR TARGET TRACKING
Filed May 31, 1946 2 Sheets-Sheet 1

INVENTORS
WILLIAM C. HARTMAN
ARTHUR B. SPERRY
BY
*Herbert* ATTORNEY.

INVENTORS
WILLIAM C. HARTMAN
ARTHUR B. SPERRY
BY
Herbert W. Thompson
their ATTORNEY.

United States Patent Office 2,983,908
Patented May 9, 1961

2,983,908
CORRECTING MEANS FOR TARGET TRACKING
William C. Hartman, Bohemia, and Arthur B. Sperry, Stewart Manor, N.Y., assignors to The Sperry Rand Corporation, a corporation of Delaware Filed May 31, 1946, Ser. No. 673,696

12 Claims. (Cl. 340—198)

This invention relates to a pendulous reference device for gun fire control apparatus.

The invention is particularly designed for use on naval vessels with known radar tracking and lead angle computing systems such as the Mark 63 system, which comprises a central station radar tracker and lead angle computer for directing the fire of 40 mm. antiaircraft guns on remotely located twin or quadruple mounts. Although this system generates complete fire control data after its radar equipment locates a target, preliminary target train and elevation data are obtained from a separate early warning radar equipment. This preliminary data is used to locate an artificial target designation projected from a radar-controlled oscilloscope into the focal plane of the eyepiece of a sighting device. The director operator sights on this spot to lay his guns and the associated radar antenna in train and elevation until his own radar equipment locates the target.

An object of the invention is the provision of a simple apparatus to stabilize the artificial target designation in elevation during the target acquisition period, to compensate for the rolling motion of the ship along the line of fire. In a preferred embodiment of the invention a differentially wound synchro-transformer has one set of windings displaced by the motion of the ship with reference to a novel pendulum acting as a plumb bob which is compensated to remain substantially stationary in space. The windings of the rotary transformer are interconnected in the gun elevation data circuits of the director, which data is modified by the action of the pendulum to correct for displacement of the deck of the ship from a level position.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The invention will now be described with the aid of the accompanying drawings, of which Fig. 1 shows a side view of a naval antiaircraft director;

Figure 1:
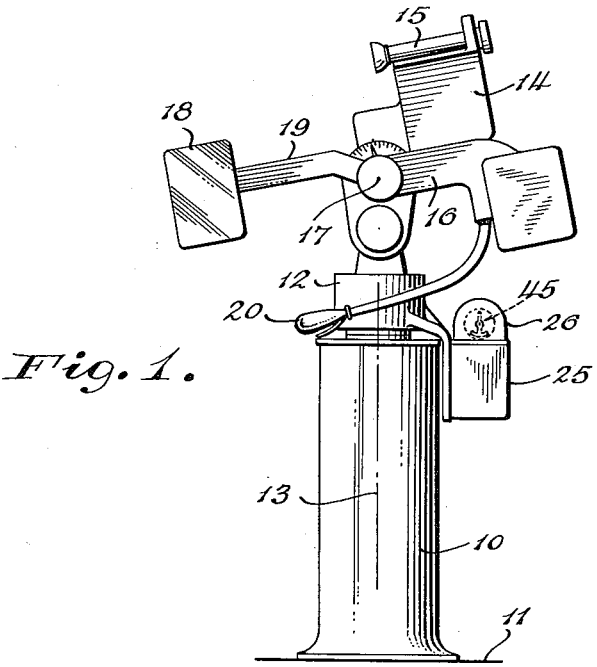

Referring to Fig. 1, a pedestal 10 secured to the deck 11 of a ship has a bracket 12 mounted for rotation thereon about the vertical or train axis 13. The bracket supports a computing gun sight mechanism 14 on which is mounted a sighting telescope 15. The computing mechanism and sight are supported by arms 16 pivoted on trunnions 17 for rotation about a horizontal or elevation axis. Counterweights 18, to counterbalance the apparatus supported by arms 16, are supported by extensions 19 of these arms. A pair of handlebars 20 are provided for turning the sight and associated apparatus in elevation and in train. It will be understood that the apparatus just described automatically positions guns, not shown, in the known manner in accordance with the angular position of the sight in elevation and train, and therefore the axis of trunnions 17 will be maintained parallel to the corresponding axes of the respective guns. A casing 25 secured to bracket 12 and rotatable therewith in train encloses a number of elements used in the apparatus. Attached to casing 25, is a second casing 26 which encloses a pendulum and synchro-transformer according to the present invention mounted on a shaft parallel to the axis of trunnions 17 and therefore parallel to the corresponding axes of the guns.

Figure 4:
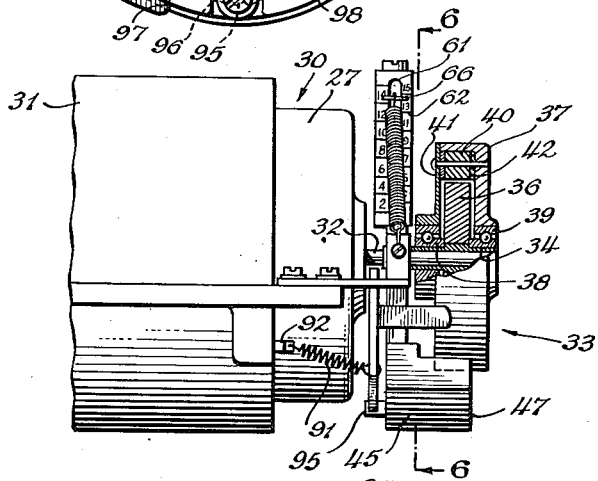
Fig. 4 is a side view.
Figure 5:
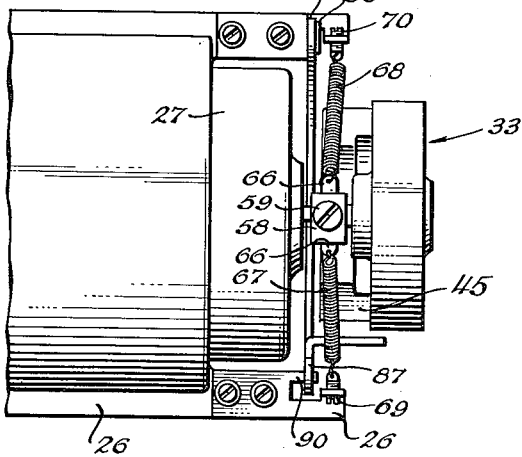
Fig. 5 is a plan view of the pendulum and synchro-transformer as they appear in operating position.

The casing 27 of the synchro-transformer 30 is shown in Figs. 4 and 5 as projecting partially from an enclosing and supporting casting 31 fixed to casing 26.

At the outer end of shaft 32 of the synchro-transformer a magnetic damping unit 33 is secured. The damping device comprises a sleeve 34 detachably fixed to shaft 32. A disc-shaped permanent magnet 36 is keyed to sleeve 34 and hence turns with shaft 32. A casing 37 enclosing the magnetic disc is supported for rotation on the sleeve by bearings 38 and 39. A heavy steel ring 40 fixed to casing 37 encloses the edge of permanent magnet 36 and is slightly spaced therefrom. Flat copper rings 41 and 42 are fixed to casing 37 on opposite sides of ring 40. It will be understood that the casing and the parts attached thereto are free to rotate about magnet 36. In operation of the damping unit, a quick rotational movement, even a slight one, of the magnet 36 will set up a magnetic force coupling between the magnet and the case; thus the magnet tends to drag the case along with it. Because of its weight and consequent high inertia, the case offers sufficient resistance to the movement of the magnet to eliminate practically all violent rotational shocks.

The pendulum 45 of the present invention comprises a stem 46 carrying the pendulum weight 47. An opening formed in the upper part of the stem snugly fits over an end portion of sleeve 34. A number of longitudinal slots are formed in the sleeve in the area engaged by the stem, making a sort of a collet of this part of the sleeve. A longitudinal slot 49 in the stem 46 extends downward through opening 48, and screws 50 and 51 threaded into the stem on opposite sides of opening 48 are effective when tightened to compress the parts of the stem on opposite sides of slot 49 to lock the pendulum stem 46, sleeve 34 and shaft 32 securely together.

A crank arm 53 is fixed to the pendulum in alignment with stem 46. In the present form of the invention the crank arm comprises a bracket 54 formed of a flat strip of metal having a first vertical portion 55 attached to one side of stem 46 by screws 50 and 51. The bracket is bent forming a short horizontal portion 56 overlying the top of stem 46, and is then bent again to extend upward into a rather long vertical portion 57 aligned with the opposite side of stem 46, and thereafter again bent to form a second horizontal part 58 overlying the part 56. A lead screw 59 is supported for rotation in alignment with stem 46 in suitable openings formed in parts 56 and 58. A nut 60 on the lead screw is provided for locking the screw in position. A longitudinal slot 61 is formed in the vertical part 57 of the bracket, and a scale 62 is imprinted on the bracket along side the slot as shown in Fig. 4.

Lead screw 59 is provided with a lead nut 65 to which

's fixed an index arm 66, one end of which projects through slot 61 and thus prevents nut 65 from rotating when screw 59 is adjusted.

One end of each of the torque springs 67 and 68 is attached to index arm 66. The opposite ends of the springs are attached symmetrically to tension adjusting screws 69 and 70 supported by small brackets fixed with respect to casing 26 on opposite sides of shaft 32 of the synchro-transformer.

A pendulum of the plumb bob type on shipboard is susceptible to two main acceleration forces namely, the force of gravity, and the ship's roll acceleration force. The acceleration of the ship's roll varies in accordance with the formula:

$$a = \omega^2 X_0 \sin \omega t$$

where $X_0$ = height above metacenter,
$\omega = 2\pi f$ ($f$ = frequency of roll).
$t$ = time.

In other words, the formula states that the acceleration due to ship's roll is a function of the metacentric height and the ship's roll period.

For any given installation $X_0$ is a constant. Also, for any given ship, the roll period is roughly constant, independent of roll amplitude. Therefore, it may be said that the acceleration condition due to ship's roll for any given installation is of substantially constant nature. If the pendulum is restrained by a spring force calculated to equal the force of ship's roll acceleration, the pendulum will remain aligned with the force of gravity. In the present invention, the torque springs are arranged to act on crank arm 53 which is part of the pendulum to produce a force which varies sinusoidally with the pendulum position. Consequently, the sinusoidally varying acceleration, $a$, of the above formula, is continuously balanced by the sinusoidally varying spring force. Hence, at any instant of ship's roll the resultant of the forces lies along the line of gravity.

Figure 3:
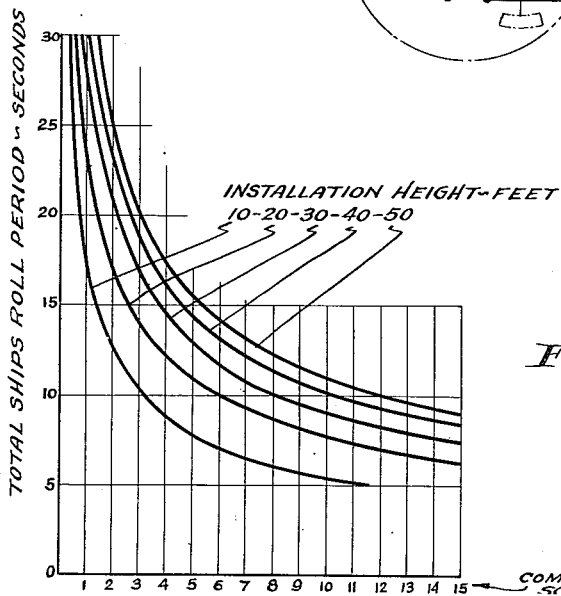
Fig. 3 is a chart for use in adjusting the compensating springs of the pendulum.

The scale 62 is fixed to, and hence, moves with the pendulum. The index arm 66 can be moved along the scale by adjusting screw 59 in accordance with the chart of Fig. 3. This chart is a graphical representation of the above formula converted into positions assumed by the pendulum under the action of the force of ship's roll acceleration. The pendulum assembly is mounted on the director so that the stabilized elevation plane moves in train with the director. Referring to the chart, pendulum installation heights as ordinates and scale markings as abscissas are plotted against various curves representing ship's roll period in seconds. The use of the chart is shown in the following example:

Given:
  Pendulum installation height, feet=20.
  Ship's roll period, seconds=10.
Find:
  Scale setting.

From 20 on the axis of ordinates, run along the horizontal line to the intersection of the curve marked 10. Directly below, on the axis of abscissas, read scale setting 6. Accordingly, the arm 66 is set at 6 on scale 62.

Figure 2:
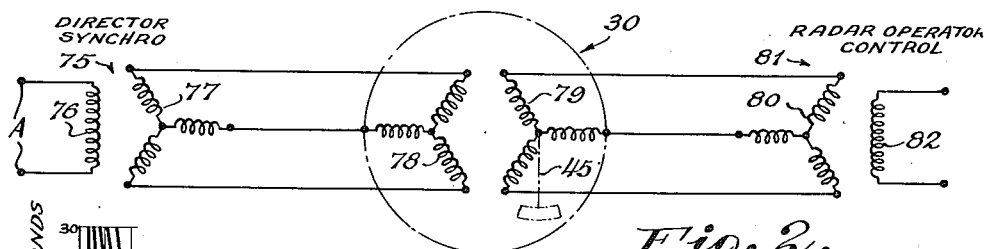
Fig. 2 is a wiring diagram of the differential transformer.

As the ship rolls along the line of fire the pendulum remains stationary and the stator of the differential synchro is displaced with respect to its rotor. This arrangement may be used to correct known data transmission circuits for the roll of the ship. A simple circuit for this purpose, including the synchro-transformer, is shown in Fig. 2. The operation of such circuits and the elements included therein are well known and therefore the arrangement will be briefly described.

Referring to Fig. 2, a director synchro-transformer 75 having a rotor and a three-phase stator is assumed to be actuated by displacement of the director about its elevation axis. The phase windings of stator 77 are interconnected with corresponding phase windings of the stator 78 of differential synchro-transformer 30 whose rotor 79 is fixed to the pendulum. The phase windings of the rotor 79 are connected to corresponding phase windings of the stator 80 of a synchro-transformer 81 which cooperates with a single phase winding 82 variably energized by voltages set up in stator 80. As is well known, relative displacement of the windings 78 and 79 of the differential synchro-transformer, will modify the data transmitted through the circuit in accordance with the angle of this displacement, and hence the elevation angle signal induced in winding 82 which is used to furnish data to the radio operator control will be corrected for roll along the line of fire.

An arrangement is provided for caging or securing the pendulum against movement which is desirable when certain tests are made. The pendulum may be caged by a curved lever 85 pivoted at one end on a stud 86 and normally positioned clear of the path of the pendulum. Two holes 87 and 88 are formed in the opposite end of the lever either of which may be latched over a pin 90, Fig. 5. Spring 91 attached to the lever 85 and a stud 92 fixed to the casing holds the lever in place once pin 90 has been inserted into either of the openings therein.

Figure 6:
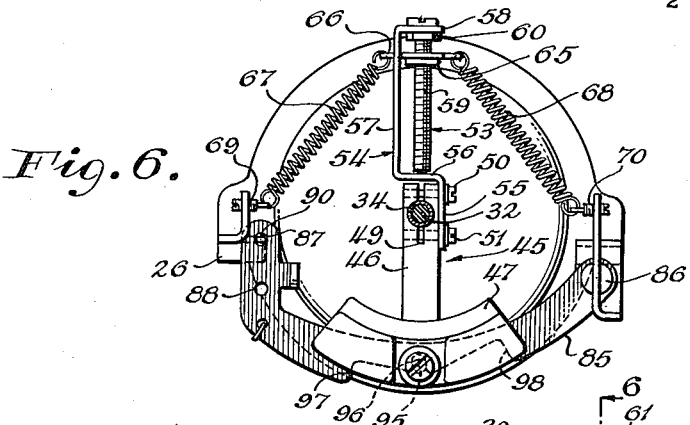
Fig. 6 is a section, taken through 6—6 of Fig. 4.

The lever is shown in Fig. 6 in its lower position with pin 90 in hole 87 in which position the pendulum is caged. For this purpose, a pin 95 projects outwardly from the pendulum and when the lever is lowered into the caging position the pin is engaged by a notch 96 formed in the underside of the lever and the pendulum is thus held against movement. On opposite sides of the notch 96, lever 85 is cut away for a distance, leaving shoulders 97 and 98. When the lever is in the upper position, that is, elevated from the position shown in Fig. 6 to one where pin 90 is positioned in hole 88 of the lever, the shoulders 97 and 98 are disposed in the path of pin 95 of the pendulum and limit the relative displacement thereof, to ±30°. This is the normal position of the lever when the device is operating.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a target tracking device movable about train and elevation axes mounted on the deck of a ship, a vertical reference for correcting for roll of the ship along the line of fire comprising a shaft mounted for relative rotation in the device in parallel relation with the elevation axis, a pendulum depending from the shaft and fixed thereto, spring means tensioned according to the distance of the device from the metacenter of the ship attached to the pendulum for the purpose of overcoming accelerations due to the roll of the ship which might be imparted thereto and circuit means in the target tracking device actuated by the shaft according to the angular displacement thereof in its mounting.

2. A target tracking device movable about train and elevation axes mounted on the deck of a ship, a shaft therefor mounted in the device for relative rotation with respect thereto to provide a vertical reference, means for maintaining the shaft stationary during roll of the ship along the line of fire comprising a pendulum depending from the shaft and fixed thereto, means for overcoming accelerations of the pendulum due to roll of the ship comprising a pair of springs attached to the pendulum and to the device, the springs being arranged symmetrically in a plane at right angles to the shaft and tensioned in accordance with the height of the device above the metacenter of the ship and circuit means in the target tracking device actuated by the shaft according to the angular displacement thereof in its mounting.

3. A target tracking device movable about train and elevation axes mounted on the deck of a ship, a vertical reference for correcting for roll of the ship along the line of fire comprising a relatively rotatable shaft mounted on the device in parallel relation with the elevation axis, a pendulum depending from the shaft and fixed thereto, an arm fixed to the pendulum extending upward therefrom and in alignment therewith, a pair of springs attached at one end to the device, the opposite ends being attached symmetrically to the arm on opposite sides thereof, the springs being calibrated to overcome accelerations imparted to the pendulum due to the roll of the ship and a roll correction circuit including a transformer having a rotor member operatively connected with said shaft.

4. In a target tracking device movable about train and elevation axes mounted on the deck of a ship, a vertical reference for correcting for roll of the ship along the line of fire comprising a rotatable shaft mounted on the device in parallel relation with the elevation axis, a pendulum depending from the shaft and fixed thereto, an arm fixed to the pendulum extending upward therefrom in alignment therewith, a pair of springs attached at one end to the device, the opposite ends of the springs being attached symmetrically to the arm on opposite sides thereof, the springs being calibrated to overcome accelerations imparted to the pendulum due to the roll of the ship, means for moving for adjusting both springs according to the distance from the metacenter of the ship and a roll correction circuit including a transformer having a rotor member operatively connected with said shaft.

5. In a target tracking device movable about train and elevation axes mounted on the deck of a ship, a shaft providing a vertical reference therefor supported for relative rotation by the device in parallel relation with the elevation axis, a pendulum pending from the shaft and fixed thereto, an arm fixed to the pendulum extending upward therefrom and aligned therewith, a scale on the arm, an index member supported by the arm movable with reference to the scale, a pair of springs attached respectively to the index member on opposite sides of the arm and to the device, the springs being calibrated to overcome accelerations imparted to the pendulum by the roll of the ship whereby the shaft is held stationary by the pendulum during roll of the ship along the line of fire, means for adjusting the index member and thereby the springs according to the scale to compensate for the distance of the device from the metacenter of the ship and a roll correction device operatively connected with said shaft.

6. In a target tracking device movable about train and elevation axes mounted on the deck of a ship, circuit means providing gun elevation data controlled thereby, means for correcting said data for roll of the ship along the line of fire comprising a differential synchro-transformer supported by the device having rotor and stator windings interconnected in the circuit means, a shaft for the rotor winding disposed parallel to the elevation axis, a pendulum depending from the shaft and fixed thereto, and spring means attached to the pendulum and to the device effective to maintain the pendulum vertical during roll of the ship along the line of fire.

7. In a target tracking device movable about train and elevation axes mounted on the deck of a ship, circuit means providing gun elevation data controlled thereby, means for correcting said data for roll of the ship along the line of fire comprising a differential synchro-transformer supported by the device having rotor and stator windings interconnected in the circuit means, a shaft for the rotor winding disposed in parallel relation to the elevation axis, a pendulum depending from the shaft and fixed thereto, a damping device supported by the shaft for eliminating gun fire shock, and spring means attached to the pendulum and to the device effective to maintain the pendulum vertical during roll of the ship along the line of fire.

8. In a target tracking device movable about train and elevation axes mounted on the deck of a ship, circuit means providing gun elevation data controlled thereby, means for correcting said data for roll of the ship along the line of fire comprising a differential synchro-transformer supported by the device having rotor and stator windings interconnected in the circuit means, a shaft for the rotor winding disposed in parallel relation to the elevation axis, a pendulum depending from the shaft and fixed thereto, means for overcoming accelerations imparted to the pendulum by roll of the ship along the line of fire which comprises a pair of springs attached to the pendulum and to the device, the springs being arranged symmetrically in a plane at right angles to the shaft and tensioned in accordance with the natural period of roll of the ship and the height of the device above the metacenter thereof.

9. In a target tracking device movable about train and elevation axes mounted on the deck of a ship, circuit means providing gun elevation data controlled thereby, means for correcting said data for roll of the ship along the line of fire comprising a differential synchro-transformer supported by the device having rotor and stator windings included in said circuit means, a shaft for the rotor winding disposed in parallel relation to the elevation axis, a device supported by the shaft to damp the shaft against gun fire shock, a pendulum fixed to the shaft, means for maintaining the pendulum in vertical position comprising a pair of springs attached to the pendulum and to the device disposed symmetrically in a plane at right angles to the shaft and tensioned in accordance with the natural period of roll of the ship and the height of the device above the metacenter of the ship for the purpose of overcoming any accelerations imparted to the pendulum due to roll of the ship along the line of fire.

10. In a target tracking device movable about train and elevation axes mounted on the deck of a ship, circuit means providing gun elevation data controlled thereby, means for correcting the data for roll of the ship along the line of fire comprising a differential synchro-transformer supported by the device having rotor and stator windings included in the circuit means, a shaft for the rotor winding disposed in parallel relation with the elevation axis, a pendulum fixed to the shaft, means for maintaining the pendulum in vertical position comprising an arm fixed to the pendulum extending upward therefrom in alignment therewith, a pair of springs attached at one end to the device, the opposite ends of the springs being attached to the arm on opposite sides thereof, the springs being tensioned to overcome accelerations which might be imparted to the pendulum due to roll of the ship along the line of fire, and common means for adjusting both springs in accordance with the distance of the device from the metacenter of the ship.

11. In a target tracking device movable about train and elevation axes mounted on the deck of a ship, circuit means providing gun elevation data controlled thereby, means for correcting the data for roll of the ship along the line of fire comprising a differential synchro-transformer supported by the device having rotor and stator windings included in the circuit means, a shaft for the rotor winding disposed in parallel relation to the elevation axis, a damping device supported by the shaft for protecting the same from shock due to gun fire, a pendulum fixed to the shaft, means for maintaining the pendulum in vertical position comprising an arm fixed to the pendulum extending upward therefrom in alignment therewith, a pair of springs attached at one end to the device, the opposite ends of the springs being attached to the arm on opposite sides thereof, the springs being tensioned to overcome accelerations which might be imparted to the pendulum due to roll of the ship along the line of fire, and common means for adjusting both springs in accordance with the distance of the device from the metacenter of the ship.

12. In a target tracking device movable about train and elevation axes mounted on the deck of a ship, circuit means providing gun elevation data controlled thereby, means for correcting the data for roll of the ship along the line of fire comprising a differential synchro-transformer supported by the device having rotor and stator windings included in the circuit means, a shaft for the rotor means disposed in parallel relation to the elevation axis, a pendulum secured to the shaft, means for maintaining the pendulum in vertical position including an arm fixed to the pendulum extending upward therefrom in alignment therewith, a scale on the arm, an index member supported by the arm adjustable with reference to the scale, a pair of springs attached respectively to opposite ends of the index member and to the device, the springs being tensioned to overcome accelerations due to the roll of the ship along the line of fire and means for adjusting the index member and thereby the tension of the springs according to the scale to vary the tension of the springs according to the distance of the device from the metacenter of the ship.

References Cited in the file of this patent
UNITED STATES PATENTS

| | | |
|---|---|---|
| 1,891,397 | Watson | Dec. 20, 1932 |
| 1,988,458 | Minorsky | Jan. 22, 1935 |